(12) United States Patent
Ma et al.

(10) Patent No.: US 12,572,821 B2
(45) Date of Patent: Mar. 10, 2026

(54) ACCURACY PRIOR AND DIVERSITY PRIOR BASED FUTURE PREDICTION

(71) Applicant: Honda Motor Co., Ltd., Tokyo (JP)

(72) Inventors: Hengbo Ma, Albany, CA (US); Jiachen Li, Albany, CA (US); Ramtin Hosseini, Malden, MA (US); Chiho Choi, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 1065 days.

(21) Appl. No.: 17/670,194

(22) Filed: Feb. 11, 2022

(65) Prior Publication Data

US 2023/0141610 A1     May 11, 2023

Related U.S. Application Data

(60) Provisional application No. 63/278,208, filed on Nov. 11, 2021.

(51) Int. Cl.
*G06N 5/02*        (2023.01)

(52) U.S. Cl.
CPC ..................................... *G06N 5/02* (2013.01)

(58) Field of Classification Search
None
See application file for complete search history.

(56) References Cited

PUBLICATIONS

Emre Aksan, Manuel Kaufmann, and Otmar Hilliges. Structured prediction helps 3D human motion modelling. In 2019 IEEE/CVF International Conference on Computer Vision (ICCV). IEEE, Oct. 2019.

Mohammad Sadegh Aliakbarian, Fatemeh Sadat Saleh, Mathieu Salzmann, Lars Petersson, Stephen Gould, and Amirhossein Habibian. Learning variations in human motion via Mix-and-Match perturbation. Aug. 2019.

A Bajcsy, S Bansal, E Ratner, C J Tomlin, and others. A robust control framework for human motion prediction. IEEE Robotics and, 2020.

A Bajcsy, A Siththaranjan, C J Tomlin, and others. Analyzing human models that adapt online. arXiv preprint arXiv, 2021.

Emad Barsoum, John Kender, and Zicheng Liu. HP-GAN: Probabilistic 3D human motion prediction via GAN. In 2018 IEEE/CVF Conference on Computer Vision and Pattern Recognition Workshops (CVPRW). IEEE, Jun. 2018.

(Continued)

*Primary Examiner* — Li B. Zhen
*Assistant Examiner* — Daravanh Phakousonh
(74) *Attorney, Agent, or Firm* — Rankin, Hill & Clark LLP

(57) ABSTRACT

Aspects related to accuracy prior and diversity prior based future prediction may include a diversity prior, a concatenator, a decoder, and a processor. The diversity prior may receive a feature extracted history portion of a time series of information and generate a diversity latent representation. The concatenator may concatenate the diversity latent representation and the feature extracted history portion to generate a second decoder input. The decoder may receive a first decoder input and a second decoder input, generate a first output based on the first decoder input, and generate a second output based on the diversity decoder input. The processor may generate an accuracy prior and diversity prior based future prediction based on the first output and the second output. The diversity prior may be trained during a training stage utilizing an accuracy prior distinct from the diversity prior.

17 Claims, 9 Drawing Sheets

(56) References Cited

PUBLICATIONS

Justin Bayer, Daan Wierstra, Julian Togelius, and Jurgen Schmidhuber. Evolving memory cell structures for sequence learning. In Artificial Neural Networks—ICANN 2009, Lecture notes in computer science, pp. 755-764. Springer Berlin Heidelberg, Berlin, Heidelberg, 2009.

J Ben Hough, Manjunath Krishnapur, Yuval Peres, and Bálint Virág. Determinantal processes and independence. PS, 3(none):206-229, Jan. 2006.

Yoshua Bengio, Aaron Courville, and Pascal Vincent. Representation learning: a review and new perspectives. IEEE Trans. Pattern Anal. Mach. Intell., 35(8):1798-1828, Aug. 2013.

Apratim Bhattacharyya, Michael Hanselmann, Mario Fritz, Bernt Schiele, and Christoph-Nikolas Straehle. Conditional flow variational autoencoders for structured sequence prediction. Aug. 2019.

Matthew Brand and Aaron Hertzmann. Style machines. In Proceedings of the 27th annual conference on Computer graphics and interactive techniques, SIGGRAPH '00, pp. 183-192, USA, Jul. 2000. ACM Press/Addison-Wesley Publishing Co.

Kyunghyun Cho, Bart van Merrienboer, Caglar Gulcehre, Dzmitry Bahdanau, Fethi Bougares, Holger Schwenk, and Yoshua Bengio. Learning phrase representations using RNN Encoder-Decoder for statistical machine translation. Jun. 2014.

C Choi and B Dariush. Looking to relations for future trajectory forecast. Proceedings of the IEEE/CVF, 2019.

C Choi, A Patil, and S Malla. Drogon: A causal reasoning framework for future trajectory forecast. arXiv e-prints, 2019.

Michal Derezinski, Daniele Calandriello, and Michal Valko. Exact sampling of determinantal point processes with sublinear time preprocessing. Adv. Neural Inf. Process. Syst., 32, 2019.

Jacob Devlin, Ming-Wei Chang, Kenton Lee, and Kristina Toutanova. BERT: Pre-training of deep bidirectional transformers for language understanding. In Proceedings of the 2019 Conference of the North American Chapter of the Association for Computational Linguistics: Human Language Technologies, vol. 1 (Long and Short Papers), pp. 4171-4186, Minneapolis, Minnesota, Jun. 2019. Association for Computational Linguistics.

Rahul Dey and Fathi M Salem. Gate-Variants of gated recurrent unit (GRU) neural networks. Jan. 2017.

Conor Durkan, Artur Bekasov, Iain Murray, and George Papamakarios. Neural spline flows. Jun. 2019.

Katerina Fragkiadaki, Sergey Levine, Panna Felsen, and Jitendra Malik. Recurrent network models for human dynamics. In 2015 IEEE International Conference on Computer Vision (ICCV). IEEE, Dec. 2015.

D Fridovich-Keil, A Bajcsy, J F Fisac, and others. Confidence-aware motion prediction for real-time collision avoidance1. Journal of Robotics . . . , 2020.

Jennifer Gillenwater, Alex Kulesza, Emily Fox, and Ben Taskar. Expectation-Maximization for learning determinantal point processes. Nov. 2014.

Boqing Gong, Wei-Lun Chao, Kristen Grauman, and Fei Sha. Diverse sequential subset selection for supervised video summarization. In Z Ghahramani, M Welling, C Cortes, N Lawrence, and K QWeinberger, editors, Advances in Neural Information Processing Systems, vol. 27. Curran Associates, Inc., 2014.

Ian J Goodfellow, Jean Pouget-Abadie, Mehdi Mirza, Bing Xu, DavidWarde-Farley, Sherjil Ozair, Aaron Courville, and Yoshua Bengio. Generative adversarial networks. Jun. 2014.

Catalin Ionescu, Dragos Papava, Vlad Olaru, and Cristian Sminchisescu. Human3.6M: Large scale datasets and predictive methods for 3D human sensing in natural environments. IEEE Trans. Pattern Anal. Mach. Intell., 36 (7):1325-1339, Jul. 2014.

Ashesh Jain, Amir R Zamir, Silvio Savarese, and Ashutosh Saxena. Structural-RNN: Deep learning on spatio-temporal graphs. In 2016 IEEE Conference on Computer Vision and Pattern Recognition (CVPR). IEEE, Jun. 2016.

Diederik P Kingma, Danilo J Rezende, Shakir Mohamed, and Max Welling. Semi-Supervised learning with deep generative models. Jun. 2014.

Diederik P Kingma and Max Welling. Auto-Encoding variational bayes. Dec. 2013.

T Kipf, E Fetaya, K CWang, and others. Neural relational inference for interacting systems. on Machine Learning, 2018.

T N Kipf and M Welling. Semi-supervised classification with graph convolutional networks. arXiv preprint arXiv:1609.02907, 2017.

T N Kipf and M Welling. Variational graph auto-encoders. arXiv preprint arXiv:1611.07308, 2016.

Alex Kulesza and Ben Taskar. k-DPPs: Fixed-Size determinantal point processes. Jan. 2011.

Jogendra Nath Kundu, Maharshi Gor, and R Venkatesh Babu. BiHMP-GAN: Bidirectional 3D human motion prediction GAN. Proc. Conf. AAAI Artif. Intell., 33:8553-8560, Jul. 2019.

J Li, H Ma, and M Tomizuka. Conditional generative neural system for probabilistic trajectory prediction. 2019 IEEE/ RSJ International, 2019.

Maosen Li, Siheng Chen, Xu Chen, Ya Zhang, Yanfeng Wang, and Qi Tian. Symbiotic graph neural networks for 3D skeleton-based human action recognition and motion prediction. IEEE Trans. Pattern Anal. Mach. Intell., pp. 1-1, Jan. 2021.

Maosen Li, Siheng Chen, Yangheng Zhao, Ya Zhang, Yanfeng Wang, and Qi Tian. Dynamic multiscale graph neural networks for 3D skeleton based human motion prediction. In 2020 IEEE/CVF Conference on Computer Vision and Pattern Recognition (CVPR). IEEE, Jun. 2020.

Xiu Li, Hongdong Li, Hanbyul Joo, Yebin Liu, and Yaser Sheikh. Structure from recurrent motion: From rigidity to recurrency. In 2018 IEEE/CVF Conference on Computer Vision and Pattern Recognition. IEEE, Jun. 2018.

Xiao Lin and Mohamed R Amer. Human motion modeling using DVGANs. Apr. 2018.

Wei Mao, Miaomiao Liu, and Mathieu Salzmann. Generating smooth pose sequences for diverse human motion prediction. Aug. 2021.

Wei Mao, Miaomiao Liu, Mathieu Salzmann, and Hongdong Li. Learning trajectory dependencies for human motion prediction. In 2019 IEEE/CVF International Conference on Computer Vision (ICCV). IEEE, Oct. 2019.

Julieta Martinez, Michael J Black, and Javier Romero. On human motion prediction using recurrent neural networks. In 2017 IEEE Conference on Computer Vision and Pattern Recognition (CVPR). IEEE, Jul. 2017.

Soohwan Park, Hoseok Ryu, Seyoung Lee, Sunmin Lee, and Jehee Lee. Learning predict-and-simulate policies from unorganized human motion data. ACM Trans. Graph., 38(6):1-11, Nov. 2019.

Dario Pavllo, David Grangier, and Michael Auli. Quater-Net: A quaternion-based recurrent model for human motion. BMVC, 2018.

Nicholas Rhinehart, Kris M Kitani, and Paul Vernaza. R2p2: A ReparameteRized pushforward policy for diverse, precise generative path forecasting. In Computer Vision—ECCV 2018, Lecture notes in computer science, pp. 794-811. Springer International Publishing, Cham, 2018.

Franco Scarselli, Marco Gori, Ah Chung Tsoi, Markus Hagenbuchner, and Gabriele Monfardini. The graph neural network model. IEEE Trans. Neural Netw., 20(1):61-80, Jan. 2009.

Jan Sedmidubsky and Pavel Zezula. Similarity search in 3D human motion data. In Proceedings of the 2019 on International Conference on Multimedia Retrieval, ICMR '19, pp. 5-6, New York, NY, USA, Jun. 2019. Association for Computing Machinery.

Hedvig Sidenbladh, Michael J Black, and Leonid Sigal. Implicit probabilistic models of human motion for synthesis and tracking. In Proceedings of the 7th European Conference on Computer Vision—Part I, ECCV '02, pp. 784-800, Berlin, Heidelberg, May 2002. Springer-Verlag.

Leonid Sigal, Alexandru O Balan, and Michael J Black. HumanEva: Synchronized video and motion capture dataset and baseline algorithm for evaluation of articulated human motion. Int. J. Comput. Vis., 87(1):4, Aug. 2009.

Kihyuk Sohn, Xinchen Yan, and Honglak Lee. Learning structured output representation using deep conditional generative models.

(56) References Cited

PUBLICATIONS https://proceedings.neurips.cc/paper/2015/file/8d55a249e6baa5c06772297520da2051-Paper.pdf. Accessed: Nov. 2, 2021.

Ilya Sutskever, James Martens, and Geoffrey E Hinton. Generating text with recurrent neural networks. ICML, 2011.

Graham W Taylor, Geoffrey E Hinton, and Sam Roweis. Modeling human motion using binary latent variables. https://proceedings.neurips.cc/paper/2006/file/1091660f3dff84fd648efe31391c5524-Paper.pdf. Accessed: Oct. 31, 2021.

Jakub Tomczak and MaxWelling. VAE with a VampPrior. In Amos Storkey and Fernando Perez-Cruz, editors, Proceedings of the Twenty-First International Conference on Artificial Intelligence and Statistics, vol. 84 of Proceedings of Machine Learning Research, pp. 1214-1223. PMLR, 2018.

Jacob Walker, Kenneth Marino, Abhinav Gupta, and Martial Hebert. The pose knows: Video forecasting by generating pose futures. In 2017 IEEE International Conference on Computer Vision (ICCV). IEEE, Oct. 2017.

Borui Wang, Ehsan Adeli, Hsu-Kuang Chiu, De-An Huang, and Juan Carlos Niebles. Imitation learning for human pose prediction. In 2019 IEEE/CVF International Conference on Computer Vision (ICCV). IEEE, Oct. 2019.

Jack M Wang, David J Fleet, and Aaron Hertzmann. Gaussian process dynamical models for human motion. IEEE Trans. Pattern Anal. Mach. Intell., 30(2):283-298, Feb. 2008.

Jingwei Xu, Huazhe Xu, Bingbing Ni, Xiaokang Yang, and Trevor Darrell. Video prediction via example guidance. Jul. 2020.

Xinchen Yan, Akash Rastogi, Ruben Villegas, Kalyan Sunkavalli, Eli Shechtman, Sunil Hadap, Ersin Yumer, and Honglak Lee. MT-VAE: Learning motion transformations to generate multimodal human dynamics. In Computer Vision—ECCV 2018, Lecture notes in computer science, pp. 276-293. Springer International Publishing, Cham, 2018.

Ye Yuan and Kris Kitani. Diverse trajectory forecasting with determinantal point processes. Jul. 2019.

Ye Yuan and Kris Kitani. DLow: Diversifying latent flows for diverse human motion prediction. Mar. 2020.

Andrei Zanfir, Eduard Gabriel Bazavan, Hongyi Xu, Bill Freeman, Rahul Sukthankar, and Cristian Sminchisescu. Weakly supervised 3D human pose and shape reconstruction with normalizing flows. Mar. 2020.

Zachary M Ziegler and Alexander M Rush. Latent normalizing flows for discrete sequences. ICML, 2019.

100

| SYSTEM | |
|---|---|
| 102 | PROCESSOR |
| 104 | MEMORY |
| 106 | DISK DRIVE |
| 110 | SENSORS |
| 112 | FEATURE EXTRACTOR |
| 120 | ENCODER |
| 132 | ACCURACY PRIOR |
| 134 | DIVERSITY PRIOR |
| 136 | CONCATENATOR |
| 140 | DECODER |
| 150 | ORACLE |

ACCURACY PRIOR AND DIVERSITY PRIOR BASED FUTURE PREDICTION

CROSS-REFERENCE TO RELATED APPLICATIONS

This application claims the benefit of U.S. Provisional Patent Application, Ser. No. 63/278,208 entitled "MULTI-OBJECTIVE DIVERSE HUMAN MOTION PREDICTION WITH KNOWLEDGE DISTILLATION", filed on Nov. 11, 2021; the entirety of the above-noted application(s) is incorporated by reference herein.

BACKGROUND

Research has explored several techniques to enhance diversity and maintain the accuracy of human motion prediction at the same time. However, most of the research needs to define a combined loss, such as the sum of likelihood loss and diversity loss and needs to determine the weights of the loss prior training. Some research has investigated how to increase the diversity of human motion prediction based on deep generative models or diverse sampling techniques. However, these efforts may suffer from mode collapse problems. Other challenges include being forced to choose a hyperparameter during training to balance the likelihood and diversity sampling.

Future prediction has been investigated with many different approaches in the computer vision community. At the early stage, several methods without deep learning techniques have been proposed, such as Gaussian process, Hidden Markov Model, and latent variable models. However, such methods may not be suitable for more complicated human motions. Other works are based on a graph neural network (GNN) to capture both the temporal and spatial information, but may fail when the predicted horizon is large.

Deep generative models may be used to estimate the data distribution. However, existing models typically need to pre-define a hyperparameter to balance the likelihood and diversity, which may not be desirable.

BRIEF DESCRIPTION

According to one aspect, a system for accuracy prior and diversity prior based future prediction may include an accuracy prior, a diversity prior, a decoder, an oracle, and a processor. The accuracy prior may generate an accuracy latent representation based on a feature extracted history portion of a time series of information. The diversity prior may generate a diversity latent representation based on the feature extracted history portion. The decoder may generate an accuracy loss based on an accuracy decoder input including the accuracy latent representation. The decoder may generate a preliminary prediction based on a diversity decoder input including the diversity latent representation. The oracle may generate one or more samples based on the preliminary prediction. The processor may generate a diversity loss based on the preliminary prediction, the accuracy loss, and one or more of the samples. The processor may perform training and updating of the diversity prior based on the diversity loss.

The decoder may include a recurrent neural network (RNN) and a multi-layer perceptron (MLP). The oracle may generate one or more of the samples based on the preliminary prediction across a time horizon including one or more time steps. The oracle may perform sampling of one or more of the samples based on a k-determinantal point process (k-DPP). The diversity prior may be implemented without the accuracy prior and without the future portion of the time series of information after training of the diversity prior is complete. The oracle may include a variational autoencoder. The time series of information may include a time series of images of poses associated with a moving object. The time series of information may include a time series of images of locations associated with a moving object. The time series of information may include a time series of behaviors associated with an object. The processor may perform training and updating of the accuracy prior based on the accuracy loss.

According to one aspect, a computer-implemented method for accuracy prior and diversity prior based future prediction may include generating an accuracy latent representation based on a feature extracted history portion of a time series of information, generating a diversity latent representation based on the feature extracted history portion, generating an accuracy loss based on the accuracy latent representation, generating a preliminary prediction based on the diversity latent representation, generating one or more samples based on the preliminary prediction, generating a diversity loss based on the preliminary prediction, the accuracy loss, and one or more of the samples, and training and updating of a diversity prior based on the diversity loss.

The generating the accuracy loss may be based on a recurrent neural network (RNN) and a multi-layer perceptron (MLP). The generating one or more samples may be based on the preliminary prediction across a time horizon including one or more time steps. The computer-implemented method for accuracy prior and diversity prior based future prediction may include sampling of one or more of the samples based on a k-determinantal point process (k-DPP). The computer-implemented method for accuracy prior and diversity prior based future prediction may include implementing the diversity prior without an accuracy prior and without the future portion of the time series of information after training of the diversity prior is complete. The receiving the preliminary prediction and generating one or more samples may be based on a variational autoencoder.

According to one aspect, a system for accuracy prior and diversity prior based future prediction may include an accuracy prior, a diversity prior, a decoder, an oracle, and a processor. The accuracy prior may generate an accuracy latent representation based on a feature extracted history portion of a time series of information. The diversity prior may generate a diversity latent representation based on the feature extracted history portion. The decoder may generate a first output based on a first decoder input including the accuracy latent representation. The decoder may generate a second output based on a second, diversity decoder input including the diversity latent representation. The processor may generate an accuracy prior and diversity prior based future prediction based on the first output and the second output. The diversity prior may be trained during a training stage utilizing the accuracy prior.

The decoder may include a recurrent neural network (RNN) and a multi-layer perceptron (MLP). The time series of information may include a time series of images of poses associated with a moving object. The time series of information may include a time series of images of locations associated with a moving object.

DETAILED DESCRIPTION

Figure 1:
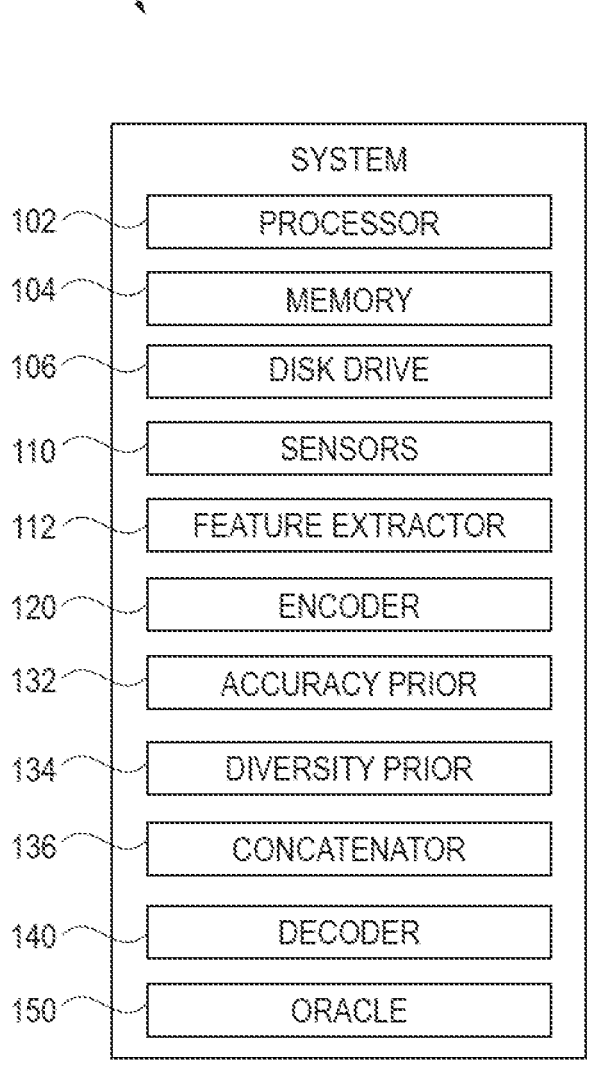
FIG. 1 is an exemplary component diagram of a system for accuracy prior and diversity prior based future prediction, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multi-core processors and co-processors and other multiple single and multi-core processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

Predicting accurate and diverse accuracy prior and diversity prior based future prediction is useful to many industrial applications, such as robotics and autonomous driving. A prediction framework that may balance likelihood sampling and diversity sampling during the testing phase is presented. A multi-objective conditional variational inference prediction model is defined herein. A short-term oracle may be implemented to encourage the prediction framework to explore more diverse future motions or branches.

Several works have attempt to obtain an accurate accuracy prior and diversity prior based future prediction without considering diversity, based on graph neural networks (GNNs) and based on recurrent neural networks (RNNs). Other research has investigated how to increase the diversity of accuracy prior and diversity prior based future prediction based on deep generative models or diverse sampling techniques. Deep generative models, such as variational autoencoder and generative adversarial net-work may naturally capture stochastic behaviors, while suffering from mode collapse problems. However, even if it is assumed that the generative models capture the actual data distribution, this captured data distribution may still be imbalanced and skewed, which makes sampling the minor modes challenging within a limited number of samples.

Other works have proposed new losses to increase the diversity meanwhile keeping the prediction naturally and accurate. A multiple sampling function may be designed to explicitly capture the different modes of the distribution based on a pre-trained conditional variational autoencoder. By using this pre-trained variational autoencoder, such methods may control the likelihood of predicted motion with a training hyperparameter. A generative model may learn the distribution implicitly. However, hyperparameter may be selected during training to balance the likelihood and diversity sampling. This selection implies that such approaches cannot be adjusted and controlled during testing.

Considering the real application, such as pedestrian motion prediction in autonomous driving, it may be useful to know all the different possible modes of motion, but also to know which modes most likely happen. Further, it may be more practical to decide the balance of likelihood sampling and diversity sampling during the testing phase for the purpose of designing the risk-averse or risk-seeking planner of autonomous vehicles rather than during the training phase. To address this problem, a multi-objective variational inference framework with two different priors is introduced.

The proposed structure makes adjusting the ratio between likelihood and diversity sampling during testing time possible. Meanwhile, since there is only one ground-truth future motion trajectory given a historical observation, a similarity-clustered based technique to obtain the multi-modal ground-truth future may be used. Similar initial poses may be grouped, and their corresponding future poses may be viewed as the pseudo-possible future motions for each initial pose in the group. Such logic may be applied recursively. At certain steps, similar poses may be grouped again and the shared futures obtained. This algorithm may boost the diversity of future motions. However, the sampling number may exponentially increase due to the recursive queries during training and make such direct implementation intractable. In order to solve this issue, a variational-autoencoder-based oracle may be introduced, which makes a short-term prediction and provides several possible future motions to supervise the prediction framework.

FIG. 1 is an exemplary component diagram of a system 100 for accuracy prior and diversity prior based future prediction, according to one aspect. The system 100 for accuracy prior and diversity prior based future prediction may include a processor 102, a memory 104, a disk drive 106, one or more sensors 110, a feature extractor 112, an encoder 120, an accuracy prior 132, a diversity prior 134, a concatenator 136, a decoder 140, and an oracle 150. The accuracy prior 132 and the diversity prior 134 may be functions or neural networks. Together, these components of the system 100 for accuracy prior and diversity prior based future prediction may perform training of a diversity prior 134, training of an accuracy prior 132, and may perform accuracy prior and diversity prior based future prediction utilizing an architecture based on the trained diversity prior 134.

The architecture of FIGS. 1-4 may enable accuracy prior and diversity prior based future prediction with accuracy for many diverse scenarios. A multi-objective conditional variational autoencoder based accuracy prior and diversity prior based future prediction framework is discussed herein. This framework may adjust the likelihood and diversity sampling ratio during the testing phases. An oracle 150 or short-term oracle may be learned and the system may distill the oracle's knowledge into the prediction framework of the system to increase the diversity of accuracy prior and diversity prior based future prediction. In order to achieve such a goal, a sample-based accuracy loss may be introduced. Although described with respect to human motion, the framework of FIGS. 1-4 may be implemented to predict motion, behaviors, trajectories, etc.

In this way, the multi-task generative prediction framework which is based on conditional variational inference is introduced. Additionally, the short-term oracle, which provides the multi-modality supervision to the prediction framework may be implemented, along with a training strategy and a testing procedure for the system.

Problem Formulation

A goal may be to predict the possible accuracy prior and diversity prior based future prediction for a dataset D. A human motion trajectory with time horizon T may be defined as $X_{t:t+T-1}=[X_t, X_{t+1}, \ldots, X_{t+T-1}]$, where $X_t \in R^d$ is the human joints Cartesian coordinates at time step t. Given an observation $C=X_{t-T_H+1:t}$, the future trajectories' distribution $P(X_{t+1:t+T_f}|C,\rho)$ may be obtained. Since such conditional probabilistic distribution may have one dominant mode, it may be difficult to sample the other modes given a fixed sampling number. If the diversity of the sampling is increased, the likelihood or prediction accuracy may be influenced. A variable $\rho \in [0, 1]$ may control the degree of diversity of prediction (e.g., diverse samples $X_{t+1:t+T_f}^i \sim P(X_{t+1:t+T_f}|C,\rho)$, i=1, . . . , n) may be obtained. In other words, the larger $\rho$ becomes, the more diverse samples may be generated and focused on the rarer cases. Conversely, the smaller $\rho$ becomes, the prediction may be more focused on the most likely modes.

Multi-Objective Predictor

A multi-objective predictor may be implemented by the system 100 for accuracy prior and diversity prior based future prediction and may include the processor 102, the memory 104, the disk drive 106, one or more of the sensors 110, the feature extractor 112, the accuracy prior 132, the diversity prior 134, the concatenator 136, and the decoder 140.

According to one aspect, a probabilistic distribution may be represented via a latent variable model:

$$P(X|C,Q)=E_{Z \sim Q(Z|C)}[P(X|C,Z)] \tag{1}$$

where Q(Z|C) may be a conditional prior distribution of latent variable $Z \in R^{d_z}$ whose dimension is $d_z$, and P(X|C, Z) may be defined as the conditional likelihood given the observation information C and latent variable Z. The prior distribution may be varied to achieve different distribution of X given the same observation C. In the system, two different prior distributions $Q_{acc}(Z|C)$ and $Q_{div}(Z|C)$ may be introduced. To obtain the most similar distribution with the data distribution $P_D$ sampling from $Q_{acc}(Z|C)$ may be performed, and obtain the most diverse distribution which mainly focuses on the minor modes, sampling from $Q_{div}(Z|C)$ may be performed. The historical observation encoder and future information encoder may be defined as:

$$e_h(C)=[MLP \circ RNN](C),$$

$$e_f(X)=[MLP \circ RNN](X) \tag{2}$$

where the temporal information of trajectories may be first encoded by using a recurrent neural network (RNN) and then using a forward neural network to map the states of RNN to the trajectory space $R^{d \cdot T_f}$. Here d may be the dimension of joints Cartesian coordinates and $T_f$ may be the prediction horizon. The decoder function $d_\theta(X|C, Z)$ may be defined as:

$$d_\theta(X|C,Z)=[MLP \circ RNN](e_h(C)\|Z) \tag{3}$$

where $\theta$ is the parameter of the decoder 140, "$\|$" may represent the concatenate operator of two vectors. Similar neural network structure may be utilized for the decoder 140 as for the encoders.

Accuracy Sampler

An accuracy sampler may be implemented by the system 100 for accuracy prior and diversity prior based future prediction and may include the processor 102, the memory 104, the disk drive 106, and the accuracy prior 132.

A first task may be to inference the accuracy prior distribution $Q_{acc}(Z|C)$. The data distribution may be approximated by sampling from the accuracy prior distribution. Hence, the variational inference may be applied, which may minimize the evidence lower bound of the likelihood:

$$\mathcal{L}_{ELBO}=E_{Q\psi(Z|X,C)}[\log P_\theta(X|Z,C)]- \\ D_{KL}[Q_\psi(Z|X,C)\|Q_{acc}(Z|C)] \tag{4}$$

where $Q\psi(Z|X, C)$ may be a posterior distribution of latent variable $Z$ given the historical observation and future information. Here, $Q_{acc}(Z|C)$ may be modeled as a Gaussian distribution $N(\mu_{\phi_{acc}}(C), \Sigma_{\phi_{acc}}(C))$. Therefore, the $KLD_{KL}[Q_\psi\|Q_{acc}]$ divergence may become:

$$\frac{1}{2}\left[\log\frac{\sum_{\phi_{acc}}}{\sum_\psi}-d_z+T_r\left(\sum_{\phi_{acc}}^{-1}\sum_\psi\right)\|\mu_{\phi_{acc}}-\mu_\psi\|_{\sum_{\phi_{acc}}^{-1}}^2\right] \tag{5}$$

However, since there may be no control over the distribution $Q_{acc}(Z|C)$, it could be arbitrarily distributed, thereby increasing the difficulty of training. Some research suggests investigating the collapse problems for conditional variational inference and that using a universal prior distribution, e.g., an isotropic Gaussian distribution, may not be a good choice for conditional distribution estimation since it is difficult to capture complex conditional multimodal data and introduce strong model bias resulting in missing modes. In order to constrain the prior distribution, a best-of-many loss may be implemented as the regularization the model:

$$\mathcal{L}_{Q_{acc}} = \frac{\min}{i}\|X^i-X\|^2 \tag{6}$$

$$z^i \sim Q(Z\,|\,C)$$

$$X^i = d_\theta(X\,|\,C, z^i), i = 1, \dots, n$$

where n is the number of samples. Thus, the overall loss for the accuracy sampler may be:

$$\mathcal{L}_{acc}(\theta,\psi)=\lambda_{elbo}\mathcal{L}_{ELBO}+\lambda_{acc}\mathcal{L}_{Q_{acc}} \tag{7}$$

where $\lambda_{elbo}$ and $\lambda_{acc}$ may be used to balance two losses.

Diversity Sampler

A diversity sampler may be implemented by the system 100 for accuracy prior and diversity prior based future prediction and may include the processor 102, the memory 104, the disk drive 106, and the diversity prior 134.

In order to explore the minor modes of possible future trajectories, the system may learn another prior distribution $Q_{div}(Z|C)$. A diversity definition may be:

$$DIV(X, Y) = \frac{1}{N_x N_y}\sum_{k,j}e^{-d(X^i,Y^j)}$$

$$X^i, Y^j \in X, Y, i = 1, \dots, N_x, j = 1, \dots, N_y \tag{8}$$

where X and Y represent two sets of samples with size $N_x$ and $N_y$. $d(\bullet,\bullet)$ may be a metric defined in the Euclidean space. Here, the metric may be defined as $d(x,y)=\eta\|x-y\|2$, where $\eta$ may be a parameter to adjust the sensitivity of diversity. The set of the samples which are generated by the major modes sampler may be denoted as $X_{acc}$, and the set of samples generated by the diversity samplers may be denoted as $X_{div}$. The diversity loss may be defined as:

$$\mathcal{L}_{div}=\alpha_{div}DIV(X_{div},X_{div})+(1-\alpha_{div})DIV(X_{div},X_{acc}) \tag{9}$$

where $DIV(X_{div}, X_{div})$ may represent the diversity of samples generated by the diversity sampler and $DIV(X_{div}, X_{acc})$ may represent the average pairwise distance between the samples from the accuracy sampler and the diversity sampler. The system may evaluate the differences between samples from the accuracy sampler and the diversity sampler. When the weight of diversity loss is large, this may have a negative influence on the accuracy sampler to approximate the data distribution. A goal or intention of the system may be to disentangle the accuracy objective and diversity objective, and thus, the pairwise distances between samples from the diversity sampler may be increased using the first term in Equation (9). Samples from the diversity sampler may be made dissimilar to the samples from the accuracy sampler using the second term in Equation (9). The relative importance of the two items in Equation (9) may be determined by a weight $\alpha_{div}$. A larger $\alpha_{div}$ may mean to focus on making the samples from $Q_{div}$ more different.

Only using the diversity loss may not be enough to obtain realistic prediction since it not only increases the differences between the samples, meanwhile, it may also make the sampler generate arbitrarily unrealistic poses. Hence, human motion from the data may be used to constrain the prediction. In order to constrain each generated trajectories, it may be assumed that there exists an oracle 150, defined as:

$$\tilde{X}_{t+1:t+\tau} \sim O(X_t, \tau) \tag{10}$$

where $O(X_t)$ may be the probabilistic distribution of future distribution with horizon $\tau$ given the current initial pose $X_t$. The oracle 150 may serves as a guide to provide supervision of the predictor. A sample-based loss may be defined as:

$$\mathcal{L}_{ref}(\tau) = \frac{1}{n}\sum_{i=1}^n\sum_{k=0}^{\lceil\frac{T}{\tau}\rceil-1}\frac{\min}{j}\|\hat{X}_{\tau:(t+1)\tau}^i-\tilde{X}_{\tau-(t+1)\tau}^j\|^2, \tag{11}$$

$$\text{s.t. } Z^i \sim Q_{div}(Z\,|\,C)$$

$$\hat{X}_{1:T}^i = d(C, Z^i),$$

$$\tilde{X}_{\tau:(t+1)\tau}^j \sim O(\tilde{X}_{t\tau-1}),$$

$$i = 1, \dots, n_{div}, j = 1, \dots, n_o, \forall\, t = 0, \dots, T/\tau$$

where $\tau$ may represent the time horizon of predicted poses from the oracle 150, $n_{acc}$ may be the number of samples of predictor, and $n_o$ may be the number of samples which the oracle 150 provides. Given one sample $\hat{X}_{r\tau:(t+1)\tau}{}^i$, the oracle 150 may provide several possible short-term futures $\tilde{X}_{r\tau:(t+1)\tau}{}^j$, given the current predicted pose $\hat{X}_{t\tau-1}{}^i$. It may be desirable for the subsequence $\hat{X}_{r\tau(t+1)r}{}^i$ to be similar to one of the provided futures $\tilde{X}_{r\tau(t+1)r}{}^j$. The diversity loss defined in Equation (9) may encourage the predictor to choose which provided accuracy prior and diversity prior based future prediction is useful to increase the diversity of all the samples. Physical constraints of predicted poses may be adopted, such as the angle likelihood, the limbs' length, and velocity to make the prediction from the diversity sampler more realistic:

$$\pounds_{pose}=\lambda_{vel}\pounds_{vel}+\lambda_{angle}\pounds_{angle}+\lambda_{limb}\pounds_{limb} \qquad (12)$$

where the velocity loss defined as the average difference between each two successive poses may be:

$$\pounds_{vel}(X) = \frac{1}{T}\sum\nolimits_{t=0}^{T-1} \|X_{t+1} - X_t\|^2 \qquad (13)$$

and the pose loss is defined as the log-likelihood of the angles respect to the origin may be:

$$\pounds_{ang}(X)=\log P(n) \qquad (14)$$

where the likelihood may be approximated by a normalizing flow. n may be the normalized direction of each joint. The predicted limbs' length 1 should be same as the ground truth, as enforced:

$$\pounds_{limb}(X) = \frac{1}{n_l}\sum\nolimits_{j} \|\hat{l}_j - l_j\|^2 \qquad (15)$$

Therefore, an overall loss for the diversity sampler may be:

$$\pounds_D=\lambda_{ref}\pounds_{ref}+\lambda_{div}\pounds_{div}+\pounds_{ang} \qquad (16)$$

Oracle

The short-term oracle O(X) may be learned by using another conditional variational autoencoder to capture the ground-truth multi-modality. This method may also be used as the multimodality evaluation metrics. In the system, the following may be defined:

$$\Omega(X_t)=S(X;\tau,K)$$

$$X_o=\{X_{t+1,t+r}{}^j \dots X_{t+1:t+\tau}{}^{|X|}\}$$

$$d(X_t{}^j,X_t)\le\delta,\forall j\in |X_o| \qquad (17)$$

where $X_o$ may represent the set of all future poses whose corresponding initial poses $X_t{}^j$ are in a ball with radius $\delta$ which centered at the given initial pose $X_t$. The ball may be defined by metric d(•,•). $\Omega(X_t)$ may represent the set of K selected future poses which has time horizon T given the initial pose $X_t{}^i$. Since there might be many similar poses to the given initial poses and most of the corresponding future poses may be very similar, a proper fixed number of future poses may be selected in X in order to capture the different modes. A k-determinantal point process (k-DPP) may be used as the selection function S to select the future poses.

k-Determinantal Point Process (k-DPP)

The k-determinantal point process may be used to sample the diverse points given a fixed number of samples. Given a set $X=\{X_1, X_2, \dots, X_n\}$, a k-determinantal point process P defined on the set X may be a probability measure on $2^X$:

$$Pr(S) = \frac{\det(L_S)1(|S = k|)}{\sum S \subset X, |S| = k^\wedge \det(L_S)} \qquad (18)$$

where S may be denoted as a subset of X and $L_S\in R^{|S|\times|S|}$ as the similarity matrix:

$$\{L_s\}_{ij}=e^{-d(X_t{}^{i+1:t+\tau},X_t{}^{j+1:t+r})} \qquad (19)$$

The training data may be pre-processed to augment each cases with K futures poses.

Oracle Neural Network

After obtaining the augmented datasets, a variational autoencoder which is similar to the accuracy sampler defined above may be used to capture the multi-modality. Since the augmented data may be relatively balanced by the k-determinantal point process, there are less extremely minor modes and hence mitigation of trouble of rare-case sampling is provided.

Training Algorithm

Input:
 N: number of epochs
 $n_{acc}$: number of samples for major modes sampler
 $n_{div}$: number of samples for diversity sampler
 $n_o$: number of samples for oracles Output:
 $\theta$, $\phi_{acc}$, $\phi_{div}$ Data:
 training dataset $D_{train}$ Training Algorithm
 $\Sigma_{i=1}{}^\infty:=0$ while epoch $\le N$ do
  Sample B={$X^i$, $C^i$}$_i\sim D_{train}$
  foreach X, C$\in$B do
   Generate $n_{acc}$ samples:
   $\hat{X}_{acc}{}^i$=d($C^i$, $Z^i$), $Z^i\sim Q_{acc}$(Z|C)
   Generate $n_{div}$ samples
   $\hat{X}_{div}{}^i$=d($C^i$, $Z^i$), $Z^i\sim Q_{div}$(Z|C)
   for t=0, . . . , $T_f/\tau$ do
    Generate $n_o$ samples:
    $\tilde{X}_{r\tau:t(\tau+1)}{}^i\sim O(\hat{X}_{t\tau-1})$
  Update $\theta$, $\psi$, $\phi_{acc}$ with $\pounds_{acc}$({X}, {$\hat{X}_{acc}$})
  Update $\theta$, $\phi_{div}$ with $\pounds_{div}$({X}, {$\hat{X}_{div}$}, {$\tilde{X}$})

Training Phase

One or more of the sensors 110 may detect, sense, or observe a time series set of information. One or more of the sensors 110 may include image capture devices, charge-coupled device (CCD), or active-pixel sensors fabricated using complementary MOS (CMOS) or N-type MOS (e.g., NMOS or live MOS) technologies. In any event, the sensor may detect the time series of information. Examples of the time series of information may include a time series of images of poses associated with a moving object, a time series of images of locations associated with a moving object (e.g., a trajectory of the object), a time series of behaviors associated with an object.

The feature extractor 112 may perform feature extraction on the time series of information. During the training phase, the time series of information may be treated as training data and be divided into multiple portions, such as a history portion and a future portion. For example, the time series of information may be broken into or divided into a training history portion and a training future portion, which may serve as ground-truth during the training phase. This division may be performed because the future may be very diverse. The feature extractor 112 may perform feature extraction on these portions. For example, the feature extractor 112 may perform feature extraction on the training history portion to generate a feature extracted history portion. Similarly, the feature extractor 112 may perform feature extraction on the training future portion to generate a feature extracted future portion.

The encoder 120 may receive the feature extracted future portion and generate an encoded feature extracted future portion based on the feature extracted future portion.

The accuracy prior 132 may receive the feature extracted history portion of a time series of information and generate an accuracy latent representation based on the feature extracted history portion. The accuracy latent representation may be a low dimensional representation or a latent variable.

The diversity prior 134 may receive the feature extracted history portion of the time series of information and generate a diversity latent representation based on the feature extracted history portion. The diversity latent representation may be a low dimensional representation or a latent variable.

Unlike most prediction systems and techniques, the use of two different, distinct priors (e.g., the accuracy prior 132 and the diversity prior 134) within the framework of the system 100 for accuracy prior and diversity prior based future prediction enables a more accurate prediction.

The concatenator 136 may concatenate the accuracy latent representation and an encoded feature extracted future portion of the time series of information to generate an accuracy decoder input. The concatenator 136 may concatenate the diversity latent representation and the feature extracted history portion to generate a diversity decoder input.

The decoder 140 may receive the accuracy decoder input and the diversity decoder input, generate an accuracy loss based on the accuracy decoder input, and generate a preliminary prediction based on the diversity decoder input. The decoder 140 may include a recurrent neural network (RNN) and a multi-layer perceptron (MLP).

The oracle 150 may be a short-term oracle and may receive the preliminary prediction and generate one or more samples based on the preliminary prediction. The oracle 150 may generate one or more samples based on the preliminary prediction associated with a time across a time horizon including one or more time steps. The oracle 150 is described in greater detail herein at FIG. 4.

The oracle 150 may include a variational autoencoder and may learn short-term oracle data. The short-term oracle data may be oracle knowledge associated with the prediction framework to increase the diversity of future time series of information, such as future motion. The oracle 150 may sample of one or more of the samples based on a k-determinantal point process (k-DPP).

The processor 102 may generate a diversity loss based on the preliminary prediction, the accuracy loss, and one or more of the samples for a given time horizon. For example, the diversity loss may be calculated at least in part based on a comparison between one or more of the samples and the preliminary prediction. This process may be repeated across one or more times steps. For example, after the first time step, a second preliminary prediction may be provided to the oracle 150, which may one or more second samples based on the second preliminary prediction associated with the second time step across the time horizon.

The processor 102 may perform training and updating of the diversity prior 134 based on the diversity loss. Thus, the oracle 150 may supervise the training of the diversity prior 134 because the diversity prior 134 may be trained based on the diversity loss and because the diversity loss is determined based on one or more of the samples from the oracle 150. The processor 102 may perform training and updating of the accuracy prior 132 based on the accuracy loss. In this way, the processor 102 may train two different, distinct prior functions (e.g., diversity prior 134 and accuracy prior 132).

Testing Procedure

Input:
    $\rho$: the ratio of sampling numbers between $Q_{acc}$ and $Q_{div}$
    M: the total number of samples Output:
    $\hat{X}^i$, the predicted poses Data:
    Testing Dataset: $D_{test}$ Testing Procedure
    foreach X, $C \in D_{test}$ do
    Generate $\rho$M samples from $Q_{acc}$
    Generate $(1-\rho)$M samples from $Q_{div}$ Execution Phase During the execution phase, after training of the diversity prior 134 is complete, the diversity prior 134 may be implemented without the accuracy prior 132 and without the future portion of the time series of information. According to one aspect, the architecture associated with the execution phase may be included within the architecture of the training phase. In other words, the architecture associated with execution may be a subset of the architecture associated with training.

One or more of the sensors 110 may detect the time series set of information during execution and the feature extractor 112 may perform feature extraction on the time series of information. Unlike the training phase, the time series of information may be treated as execution data and is not divided into multiple portions. In this regard, the time series of information may merely include an execution history portion. In any event, the feature extractor 112 may perform feature extraction on the execution history portion.

As previously indicated, the diversity prior 134 may be trained during the training phase or training stage utilizing the accuracy prior 132 distinct from the diversity prior 134. During the execution phase, this pre-trained diversity prior 134 may receive a feature extracted history portion of a time series of information and generate a diversity latent representation based on the feature extracted history portion.

During the execution phase, the concatenator 136 may concatenate the feature extracted history portion and the feature extracted history portion to generate a first decoder input. Additionally, the concatenator 136 may concatenate the diversity latent representation and the feature extracted history portion to generate a second, diversity decoder input.

During the execution phase, the decoder 140 may receive the first decoder input and the second, diversity decoder input, generate a first output based on the first decoder input, and generate a second output based on the second, diversity decoder input. Thereafter, the processor 102 may generate an accuracy prior and diversity prior based future prediction based on the first output and the second output.

Figure 2:
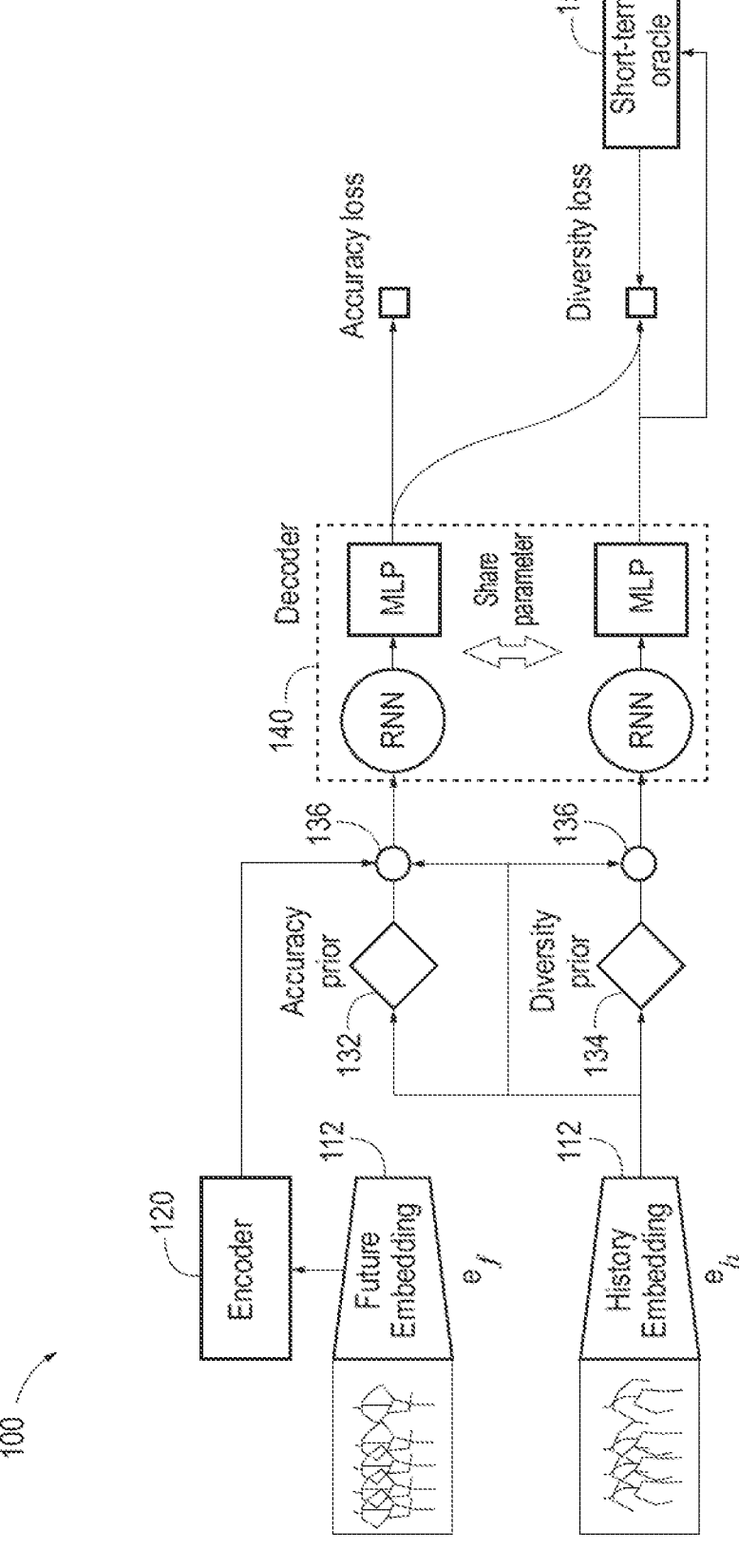
FIG. 2 is an exemplary component diagram of a system for accuracy prior and diversity prior based future prediction implemented during a training phase, according to one aspect.
Figure 3:
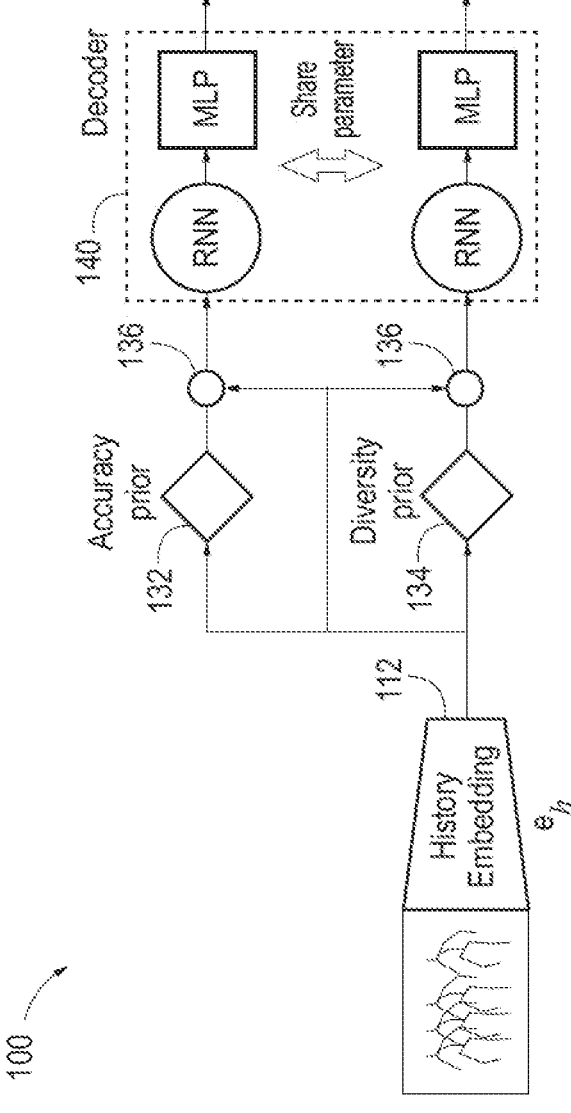
FIG. 3 is an exemplary component diagram of a system for accuracy prior and diversity prior based future prediction implemented during an execution phase, according to one aspect.
Figure 4:
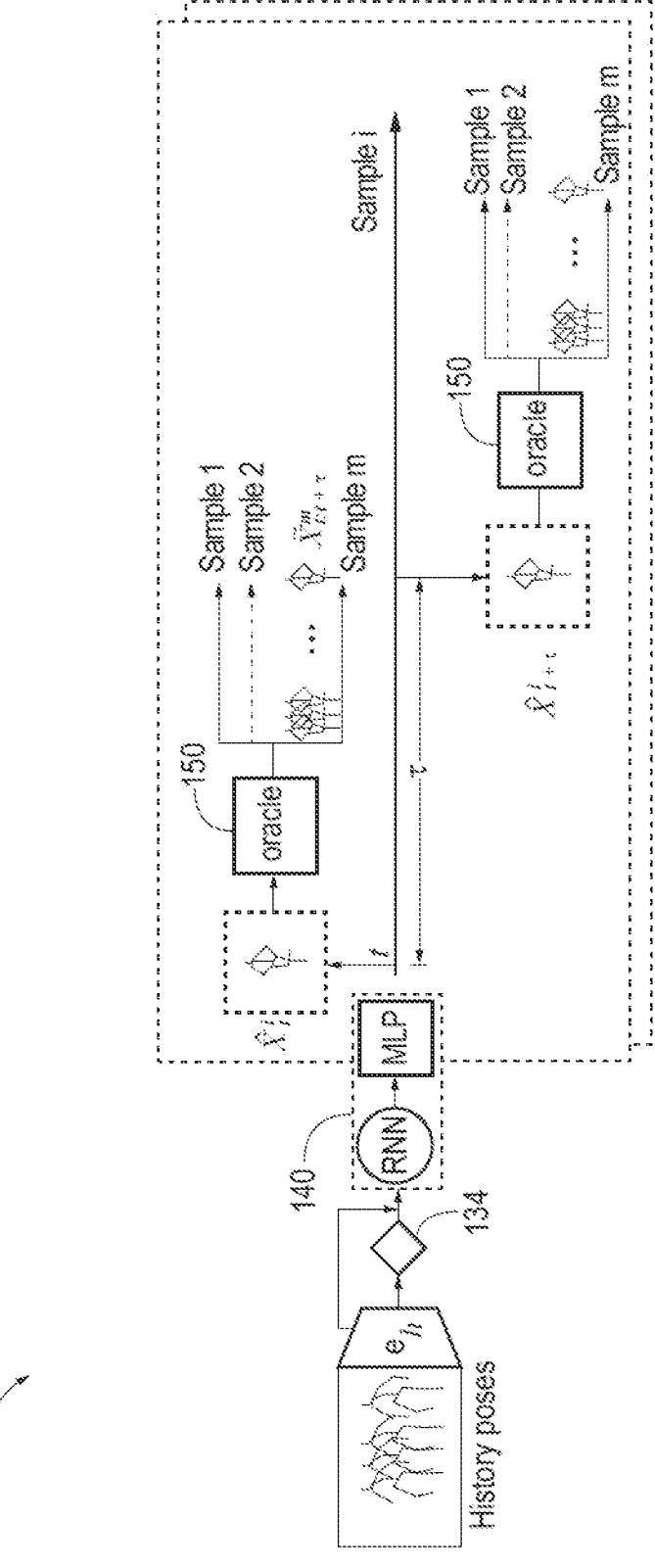
FIG. 4 is an exemplary component diagram of an oracle for the system for accuracy prior and diversity prior based future prediction of FIGS. 1-2, according to one aspect.

FIG. 2 is an exemplary component diagram of a system 100 for accuracy prior and diversity prior based future prediction implemented during a training phase, such as a phase for training and/or testing the diversity prior 134 and/or the accuracy prior 132, according to one aspect. The architectures of FIGS. 2-4 may include a multi-objective conditional variational encoder based framework. FIG. 2 may be directed toward training of the diversity prior 134. FIG. 3 may be directed toward using the trained diversity prior 134. FIG. 4 includes a detailed component diagram of the oracle 150 for the system 100 for accuracy prior and diversity prior based future prediction of FIGS. 1-2.

FIG. 3 is an exemplary component diagram of a system 100 for accuracy prior and diversity prior based future prediction implemented during an execution phase, such as a phase for executing the accuracy prior and diversity prior based future prediction based on the trained diversity prior 134, according to one aspect. It should be noted that the architecture of FIG. 3 is included within the architecture of FIG. 2. In other words, the architecture associated with execution may be a subset of the architecture associated with training.

FIG. 4 is an exemplary component diagram of an oracle 150 for the system 100 for accuracy prior and diversity prior based future prediction of FIGS. 1-2, according to one aspect. During training, several predicted motions may be obtained. For each motion (e.g., indicated by the Sample i arrow), the poses may be fed to oracle 150 after each time step τ. The oracle 150 may provide several possible future poses as one or more options (e.g., one or more of the samples generated). The predicted future motions (e.g., the preliminary prediction along the Sample i arrow) may be similar with one or more of the options or samples generated by the oracle 150 within each short time horizon. In the example depicted in FIG. 4, the time horizon may be 2τ, and thus, include two time steps τ.

Figure 5:
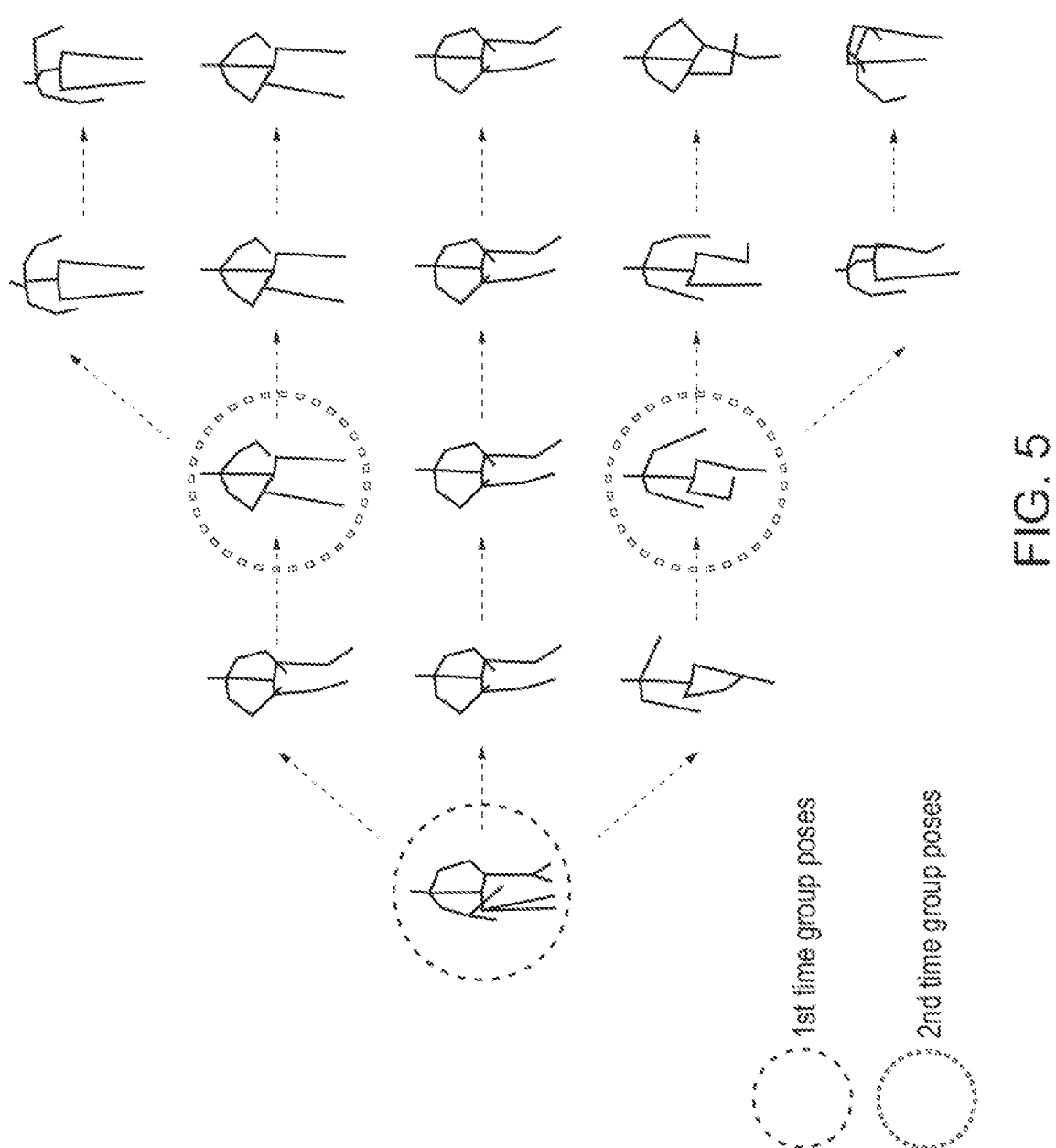
FIG. 5 is an exemplary illustration of the diversity possible during pose prediction, according to one aspect.

FIG. 5 is an exemplary illustration of the diversity possible during pose prediction, according to one aspect. FIG. 5 depicts an illustration associated with receiving multi-modal future motion from a dataset. It may be possible for the processor 102 or the system to cluster one or more similar initial poses (e.g., first time group similar pose dashed circle) and share their future poses as common ground-truth data. According to one aspect, poses of the middle row may be ground-truth poses and poses from the other rows may be augmented poses. This approach may be applied recursively (e.g., second time group similar pose dashed circle), which may lead to additional, different modes of motions.

Figure 6A:
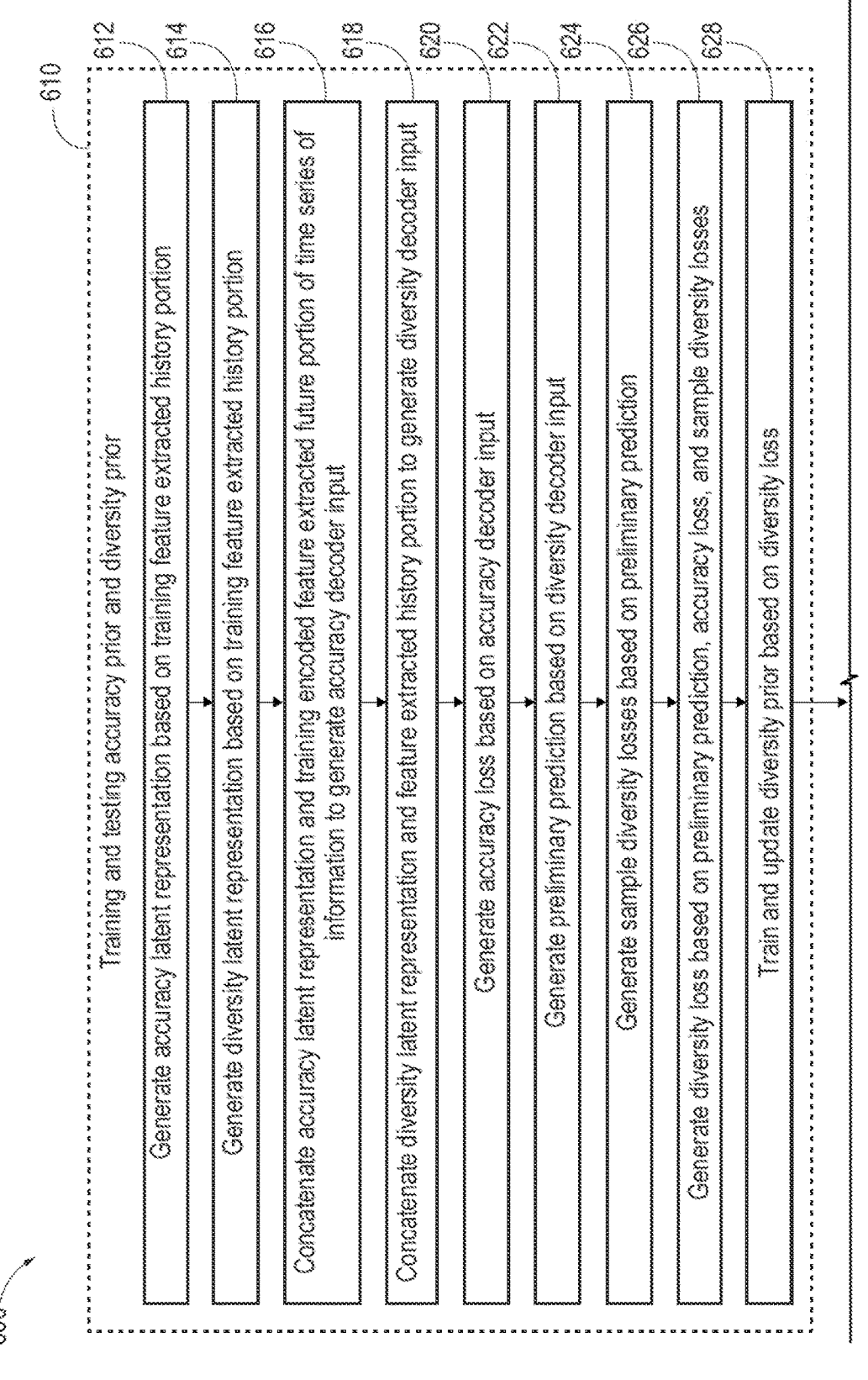
FIGS. 6A-6B are exemplary flow diagrams of a method for accuracy prior and diversity prior based future prediction, according to one aspect.
Figure 6B:
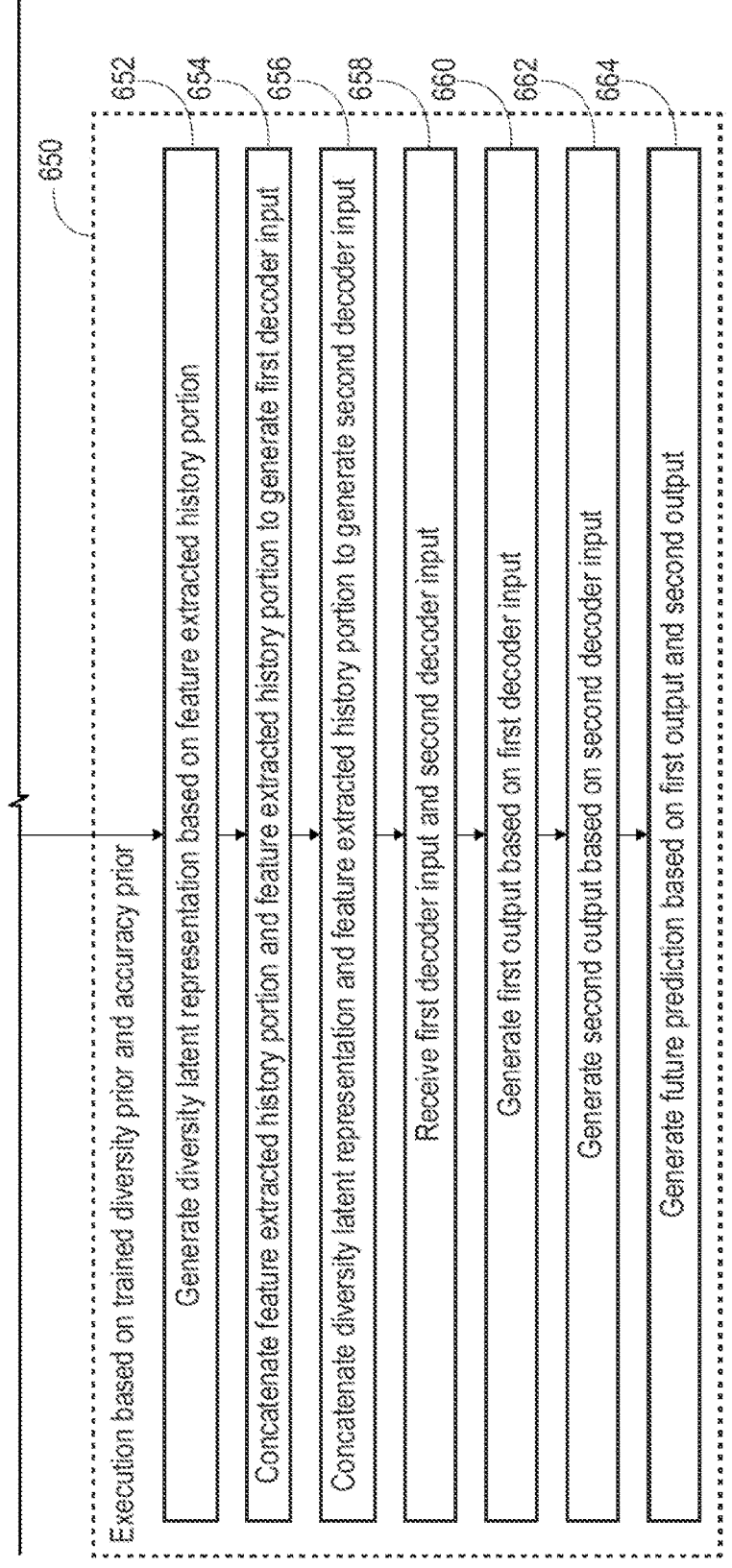

FIGS. 6A-6B are exemplary flow diagrams of a method 600 for accuracy prior and diversity prior based future prediction, according to one aspect. The method 600 for accuracy prior and diversity prior based future prediction may be computer-implemented and may be implemented via a processor, a memory, a disk drive or storage drive, etc. The method 600 for accuracy prior and diversity prior based future prediction may include a method 610 for training and testing an accuracy prior and a diversity prior and a method 650 for executing the accuracy prior and diversity prior based future prediction based on the trained diversity prior.

According to one aspect depicted in FIG. 6A, the method 610 for training and testing the accuracy prior and the diversity prior may include generating 612 an accuracy latent representation based on a training feature extracted history portion, generating 614 a diversity latent representation based on the training feature extracted history portion, concatenating 616 the accuracy latent representation and a training encoded feature extracted future portion of time series of information to generate an accuracy decoder input, concatenating 618 the diversity latent representation and the feature extracted history portion to generate a diversity decoder input, generating 620 an accuracy loss based on the accuracy decoder input, generating 622 a preliminary prediction based on the diversity decoder input, generating 624 one or more samples based on the preliminary prediction, generating 626 a diversity loss based on the preliminary prediction, the accuracy loss, and one or more of the samples, and training 628 and updating the diversity prior based on the diversity loss.

According to one aspect depicted in FIG. 6B, the method 650 for executing the accuracy prior and diversity prior based future prediction based on the trained diversity prior and accuracy prior may include generating 652 a diversity latent representation based on a feature extracted history portion, concatenating 654 the feature extracted history portion and the feature extracted history portion to generate a first decoder input, concatenating 656 the diversity latent representation and the feature extracted history portion to generate a second decoder input, receiving 658 the first decoder input and the second decoder input, generating 660 the first output based on the first decoder input, generating 662 the second output based on the second decoder input, and generating 664 a accuracy prior and diversity prior based future prediction based on the first output and the second output.

Figure 7:
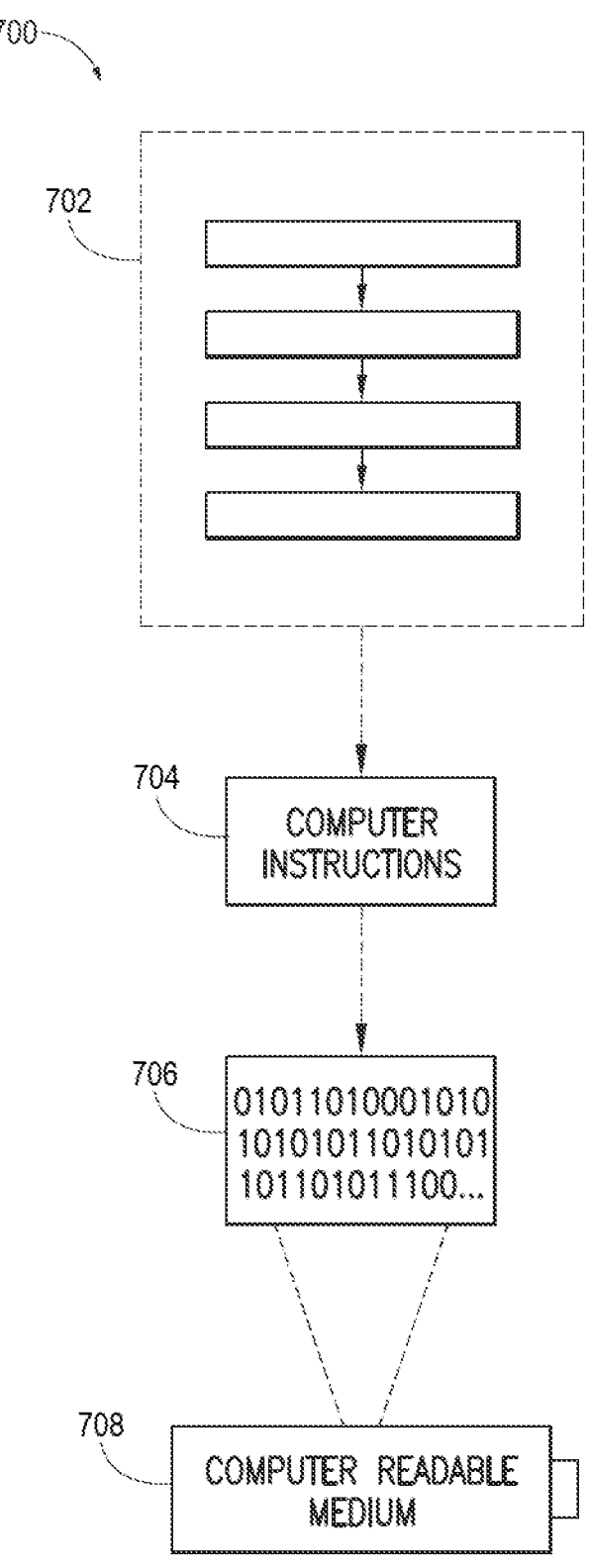
FIG. 7 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This encoded computer-readable data 706, such as binary data including a plurality of zero's and one's as shown in 706, in turn includes a set of processor-executable computer instructions 704 configured to operate according to one or more of the principles set forth herein. In this implementation 700, the processor-executable computer instructions 704 may be configured to perform a method 702, such as the method 600 of FIG. 6. In another aspect, the processor-executable computer instructions 704 may be configured to implement a system, such as the system 100 of FIG. 1, the system 200 of FIG. 2, or the system 300 of FIG. 3. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
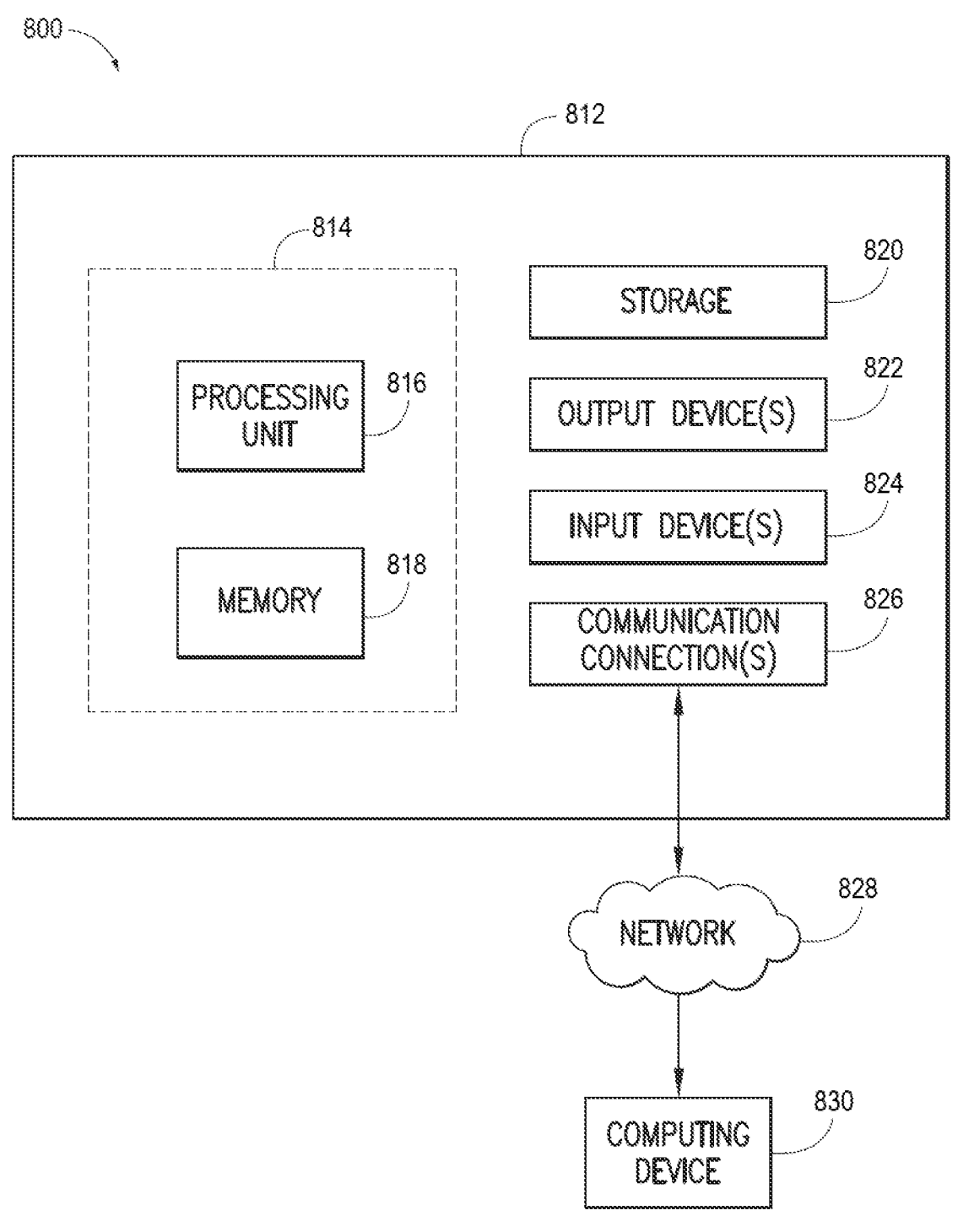
FIG. 8 is an illustration of an example computing environment where one or more of the provisions set forth herein are implemented, according to one aspect.

FIG. 8 and the following discussion provide a description of a suitable computing environment to implement aspects of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including a computing device 812 configured to implement one aspect provided herein. In one configuration, the computing device 812 includes at least one processing unit 816 and memory 818. Depending on the exact configuration and type of computing device, memory 818 may be volatile, such as RAM, nonvolatile, such as ROM, flash memory, etc., or a combination of the two. This configuration is illustrated in FIG. 8 by dashed line 814.

In other aspects, the computing device 812 includes additional features or functionality. For example, the computing device 812 may include additional storage such as removable storage or non-removable storage, including, but not limited to, magnetic storage, optical storage, etc. Such additional storage is illustrated in FIG. 8 by storage 820. In one aspect, computer readable instructions to implement one aspect provided herein are in storage 820. Storage 820 may store other computer readable instructions to implement an operating system, an application program, etc. Computer readable instructions may be loaded in memory 818 for execution by the processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 812. Any such computer storage media is part of the computing device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 812 includes input device(s) 824 such as keyboard, mouse, pen, voice input device, touch input device, infrared cameras, video input devices, or any other input device. Output device(s) 822 such as one or more displays, speakers, printers, or any other output device may be included with the computing device 812. Input device(s) 824 and output device(s) 822 may be connected to the computing device 812 via a wired connection, wireless connection, or any combination thereof. In one aspect, an input device or an output device from another computing device may be used as input device(s) 824 or output device(s) 822 for the computing device 812. The computing device 812 may include communication connection(s) 826 to facilitate communications with one or more other devices 830, such as through network 828, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for accuracy prior and diversity prior based future prediction, comprising:
an accuracy prior neural network, generating an accuracy latent representation based on a feature extracted history portion of a time series of information;
a diversity prior neural network, generating a diversity latent representation based on the feature extracted history portion;
a decoder, wherein the decoder includes a recurrent neural network (RNN) and a multi-layer perceptron (MLP):

generating an accuracy loss based on an accuracy decoder input including the accuracy latent representation; and generating a preliminary prediction based on a diversity decoder input including the diversity latent representation;

an oracle neural network, generating one or more samples based on the preliminary prediction; and a processor generating a diversity loss based on the preliminary prediction, the accuracy loss, and one or more of the samples, wherein the processor performs training and updating of the diversity prior based on the diversity loss.

2. The system for accuracy prior and diversity prior based future prediction of claim 1, wherein the oracle performs generating one or more of the samples based on the preliminary prediction across a time horizon including one or more time steps.

3. The system for accuracy prior and diversity prior based future prediction of claim 1, wherein the oracle performs sampling of one or more of the samples based on a k-determinantal point process (k-DPP).

4. The system for accuracy prior and diversity prior based future prediction of claim 1, wherein the diversity prior is implemented without the accuracy prior and without the future portion of the time series of information after training of the diversity prior is complete.

5. The system for accuracy prior and diversity prior based future prediction of claim 1, wherein the oracle includes a variational autoencoder.

6. The system for accuracy prior and diversity prior based future prediction of claim 1, wherein the time series of information includes a time series of images of poses associated with a moving object.

7. The system for accuracy prior and diversity prior based future prediction of claim 1, wherein the time series of information includes a time series of images of locations associated with a moving object.

8. The system for accuracy prior and diversity prior based future prediction of claim 1, wherein the time series of information includes a time series of behaviors associated with an object.

9. The system for accuracy prior and diversity prior based future prediction of claim 1, wherein the processor performs training and updating of the accuracy prior based on the accuracy loss.

10. A computer-implemented method for accuracy prior and diversity prior based future prediction, comprising:

generating, via an accuracy prior neural network, an accuracy latent representation based on a feature extracted history portion of a time series of information;

generating, via a diversity prior neural network, a diversity latent representation based on the feature extracted history portion;

generating an accuracy loss based on the accuracy latent representation, wherein the generating the accuracy loss is based on a recurrent neural network (RNN) and a multi-layer perceptron (MLP);

generating a preliminary prediction based on the diversity latent representation;

generating, via an oracle neural network, one or more samples based on the preliminary prediction;

generating a diversity loss based on the preliminary prediction, the accuracy loss, and one or more of the samples; and training and updating of a diversity prior based on the diversity loss.

11. The computer-implemented method for accuracy prior and diversity prior based future prediction of claim 10, wherein the generating one or more samples is based on the preliminary prediction across a time horizon including one or more time steps.

12. The computer-implemented method for accuracy prior and diversity prior based future prediction of claim 10, comprising sampling of one or more of the samples based on a k-determinantal point process (k-DPP).

13. The computer-implemented method for accuracy prior and diversity prior based future prediction of claim 10, comprising implementing the diversity prior without an accuracy prior and without the future portion of the time series of information after training of the diversity prior is complete.

14. The computer-implemented method for accuracy prior and diversity prior based future prediction of claim 10, wherein the receiving the preliminary prediction and generating one or more samples is based on a variational autoencoder.

15. A system for accuracy prior and diversity prior based future prediction, comprising:

an accuracy prior neural network, generating an accuracy latent representation based on a feature extracted history portion of a time series of information;

a diversity prior neural network, generating a diversity latent representation based on the feature extracted history portion;

a decoder, wherein the decoder includes a recurrent neural network (RNN) and a multi-layer perceptron (MLP):

generating a first output based on a first decoder input including the accuracy latent representation; and generating a second output based on a second, diversity decoder input including the diversity latent representation; and a processor generating an accuracy prior and diversity prior based future prediction based on the first output and the second output, wherein the diversity prior is trained during a training stage utilizing the accuracy prior.

16. The system for accuracy prior and diversity prior based future prediction of claim 15, wherein the time series of information includes a time series of images of poses associated with a moving object.

17. The system for accuracy prior and diversity prior based future prediction of claim 15, wherein the time series of information includes a time series of images of locations associated with a moving object.

* * * * *